Nov. 24, 1964 R. E. WAGGENER 3,158,683

COMPOSITE SIGNAL-PRODUCING APPARATUS WITH MEANS FOR PRODUCING SYNC PULSES BY OFFSETTING BLACK LEVEL

Filed Nov. 21, 1961

INVENTOR.
RICHARD E. WAGGENER
BY
Fordyce A. Bothwell
ATTORNEY 3,158,683

COMPOSITE SIGNAL-PRODUCING APPARATUS WITH MEANS FOR PRODUCING SYNC PULSES BY OFFSETTING BLACK LEVEL

Richard E. Waggener, Philadelphia, Pa., assignor, by mesne assignments, to Philco Corporation, Philadelphia, Pa., a corporation of Delaware Filed Nov. 21, 1961, Ser. No. 153,931
9 Claims. (Cl. 178—7.2)

This invention relates to the production of a composite signal having both video and synchronizing components, as in the standard television signal.

As is well known, the video component of such a signal is produced by successive line and field scanning of an image, a complete scanning being one frame. For proper synchronization of a receiver with the transmitter it is necessary to transmit line and field synchronizing information along with the picture information. In practice this is done by providing a blanking or "black" level in the signal after each line scan and after each field scan, and by providing "blacker than black" synchronizing pulses during the blanking intervals. In the conventional television system this requires generation of blanking and synchronizing signals and combining of these signals with the video or picture signal.

One object of the present invention is to generate the entire composite signal within the camera and thus eliminate the need for separately generating and combining the synchronizing signals.

While not limited thereto, this invention is particularly well adapted for use in slow scan television systems by which it is possible to transmit still pictures with sufficiently high resolution over a narrow band channel such as a telephone line ordinarily used for voice transmission.

Accordingly a more specific object of the invention is to provide a slow scan camera which is adapted to produce a composite signal of the character above mentioned.

In accordance with this invention, an image is produced and is scanned by a scanning disk or drum, e.g a Nipkow disk; a constant low level of illumination is provided over the image area to establish the "black" level in the signal produced by scanning of the image; and "blacker-than-black" synchronizing pulses are provided in said signal by interrupting the passage of light to the signal-producing means. Preferably both line and field synchronizing pulses are produced in this manner, as this avoids entirely the use of separate synchronizing signal generators. However it is within the purview of the invention to produce only one of the synchronizing signals in this manner and to employ a signal generator to produce the other synchronizing signal.

Figure 1:
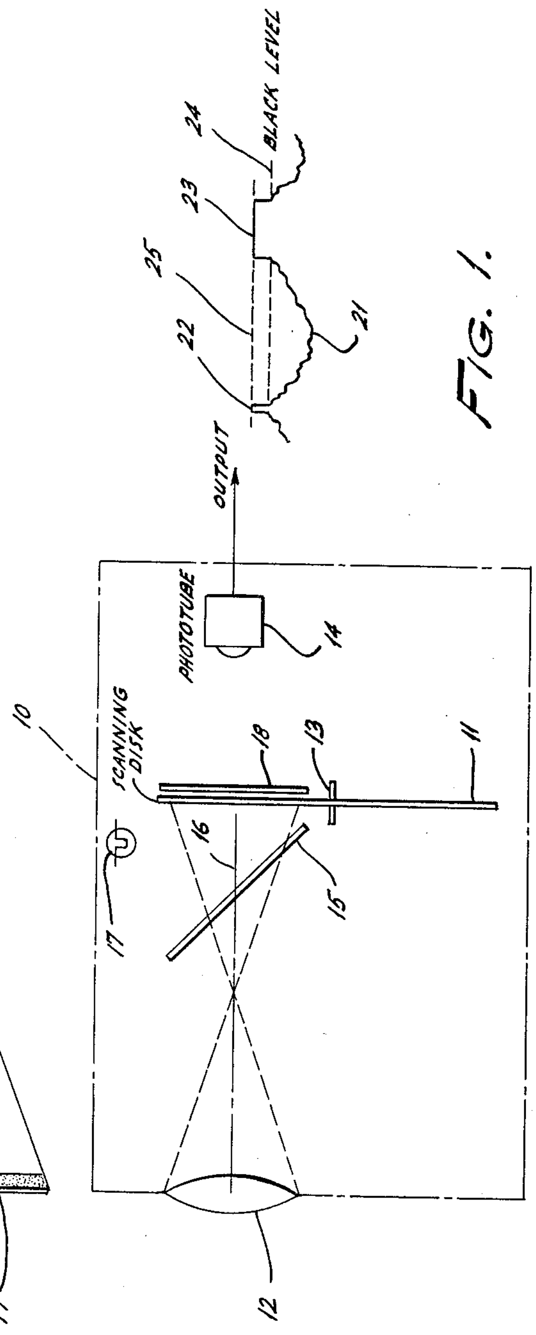
Figure 2:
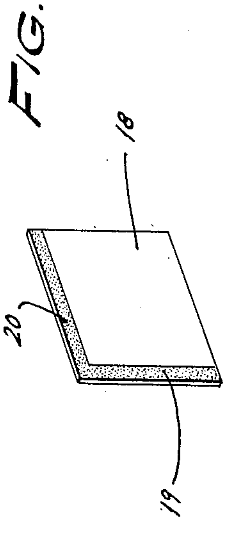

The invention may be fully understood from the following detailed description with reference to the accompanying drawing wherein:

FIG. 1 is a diagrammatic illustration of a television camera according to one embodiment of this invention; and FIG. 2 is a perspective view of a masking member employed in said camera.

Referring more particularly to the drawing, there is represented in dot and dash outline in FIG. 1 a camera casing 10 within which there is provided an image-scanning arrangement which in this instance employs a Nipkow disk 11 having spirally-arranged scanning apertures as well known in the art. A lens 12 projects an image to be scanned onto one side of said disk which is rotatably driven about its axis of rotation 13 to scan the image in successive lines and fields as well understood. The light passing through the disk apertures is received by a phototube 14 which produces an output signal representative of the image.

In accordance with this invention a constant low level of illumination is provided over the image area to establish the "black" level in the signal. In other words, a uniform low background illumination is established on which the image is superimposed. In the illustrated embodiment this is accomplished by providing a stationary transparent reflecting member 15 arranged as shown at an angle of 45° to the optical axis 16, and by providing a source of constant illumination such as a D.C. lamp 17 which provides uniform illumination over said member. The member 15 may be a partially silvered mirror having low reflectivity and being transparent to the light from lens 12, or it could be ordinary window glass which is slightly reflective.

Further in accordance with this invention, provision is made for periodically blocking the light passage to photocell 14 so as to produce "blacker-than-black" synchronizing pulses in the output signal. In the arrangement shown this is accomplished by providing immediately adjacent to the image area of disk 11 a stationary member 18 which, as shown in FIG. 2, has opaque marginal maskings 19 and 20 but is otherwise transparent. The unmasked area corresponds to the image area.

Instead of employing the member 18 the disk 11 itself could be constructed so as to interrupt the light passage between successive field scans. However it is preferred to employ the masking member.

During each line scan of the image area, a picture signal component such as shown at 21 is produced. Between consecutive line scans of the picture area the masking means 19 produces a horizontal synchronizing pulse as shown at 22, and between consecutive field scans the masking means 20 produces a vertical synchronizing pulse such as shown at 23. Because of the "black" level 24 established by the low uniform background illumination level over the image area, the synchronizing pulses extend into the "blacker-than-black" region. In other words, level 25 represents zero output of the phototube 14, and level 24 represents a low level constant output on which the picture or video signal 21 is superimposed.

It will be apparent, of course, that the phototube 14 cannot be exposed to direct light from lamp 17 as this would defeat the purpose, but obviously this can be prevented by suitable shielding.

It will thus be seen that this invention provides a simple arrangement for producing a composite television signal entirely within the camera, eliminating the necessity for separately generating blanking and synchronizing pulses and combining them with the picture signal.

It will be apparent that the masking means 19 can be provided along either side margin of member 18, and the masking means 20 can be provided along either the top or bottom margin of said member.

While a single embodiment of the invention has been illustrated and described in a slow scan camera, it will be understood that the invention is not limited thereto but contemplates such modifications and other embodiments as may occur to those skilled in the art. For example, instead of employing the member 15, a small light source could be arranged to illuminate the image area directly at low level. Such light source could be located outside the optical projection field of lens 12, or if small enough so as not to materially affect the projected image it could be located within said field.

I claim:

1. In a composite signal-producing apparatus wherein an image is scanned in successive lines by a moving scanning member which permits passage of light from the image to light-responsive signal-producing means, the improvement which comprises means for providing over the image area a constant low level of illumination, thereby to establish a "black" level in the produced signal, and means for interrupting the light passage to said signal-producing means between succesisve line scans of the image, thereby to provide in said signal synchronizing pulses on the "blacker-than-black" side of said level.

2. In a composite signal-producing apparatus wherein an image is scanned in successive lines and fields by a moving scanning member which permits passage of light from the image to light-responsive signal-producing means, the improvement which comprises means for providing over the image area a constant low level of illumination, thereby to establish a "black" level in the produced signal, and means for interrupting the light passage to said signal-producing means between successive line and field scans of the image thereby to provide in said signal line and field synchronizing pulses on the "blacker-than-black" side of said level.

3. Composite signal-producing apparatus, comprising means for creating an image to be scanned, means including a rotatable scanning member having scanning windows or apertures for scanning said image in successive lines and fields, means for translating light passing through said apertures from said image into an electrical signal, means for providing over the image area a constant low level of illumination, thereby to establish a "black" level in said signal, and means for interrupting the light passage to said translating means between successive line scans of the image, thereby to provide in said signal line synchronizing pulses on the "blacker-than-black" side of said level.

4. Composite signal-producing apparatus, comprising means for creating an image to be scanned, means including a rotatable scanning member having scanning windows or apertures for scanning said image in successive lines and fields, means for translating light passing through said apertures from said image into an electrical signal, means for providing over the image area a constant low level of illumination, thereby to establish a "black" level in said signal, means for interrupting the light passage to said translating means between successive line scans of the image, and means for interrupting the light passage to said translating means between successive field scans, whereby to provide in said signal both line and field synchronizing pulses on the "blacker-than-black" side of said level.

5. Composite signal-producing apparatus, comprising means for producing an image to be scanned in successive lines, means providing a low uniform level of background illumination of said image, means for effecting successive line scanning of said image and an adjacent area, means for producing in response to the scanning of said image a video signal having a "black" level established by said low uniform level of background illumination, and means on said area for causing said signal-producing means to produce "blacker-than-black" synchronizing pulses.

6. Composite signal-producing apparatus, comprising means for producing an image to be scanned in successive lines, means providing a low uniform level of background illumination of said image, means for effecting successive line and field scanning of said image and adjacent areas both in the line scanning direction and transverse thereto, means for producing in response to the scanning of said image a video signal having a "black" level established by said low uniform level of background illumination, and means on said areas for causing said signal-producing means to produce "blacker-than-black" synchronizing pulses.

7. Composite signal-producing apparatus according to claim 6, wherein said scanning means is a rotating disk.

8. Composite signal-producing apparatus, comprising means for producing an image to be scanned in successive lines, opaque masking means along a margin of the image area transverse to the direction of line scanning, opaque masking means along another margin of said image area parallel to the direction of line scanning, means providing a low uniform level of illumination over said image area, means for projecting an image onto said image area, means for effecting successive line and field scanning of said area and the masked margins, and means for producing in response to said scanning a composite signal having video and synchronizing components of opposite polarities with respect to a "black" level established by said low level of illumination.

9. Composite signal-producing apparatus according to claim 8, wherein said scanning means is a rotating disk.

References Cited in the file of this patent

UNITED STATES PATENTS

| | | |
|---|---|---|
| 2,151,942 | Scheppmann | Mar. 28, 1939 |
| 2,169,654 | Maguire | Aug. 15, 1939 |
| 2,368,884 | Schade | Feb. 16, 1945 |
| 2,543,066 | Salinger | Feb. 27, 1951 |
| 2,954,427 | Covely | Sept. 27, 1960 |
| 2,957,941 | Covely | Oct. 25, 1960 |